Nov. 3, 1959
C. P. WARMAN, JR
2,910,881
AXIALLY EXPANSIBLE AIR TUBE, MULTIPLE CLUTCH REVERSING UNIT
Filed May 28, 1957
3 Sheets-Sheet 1
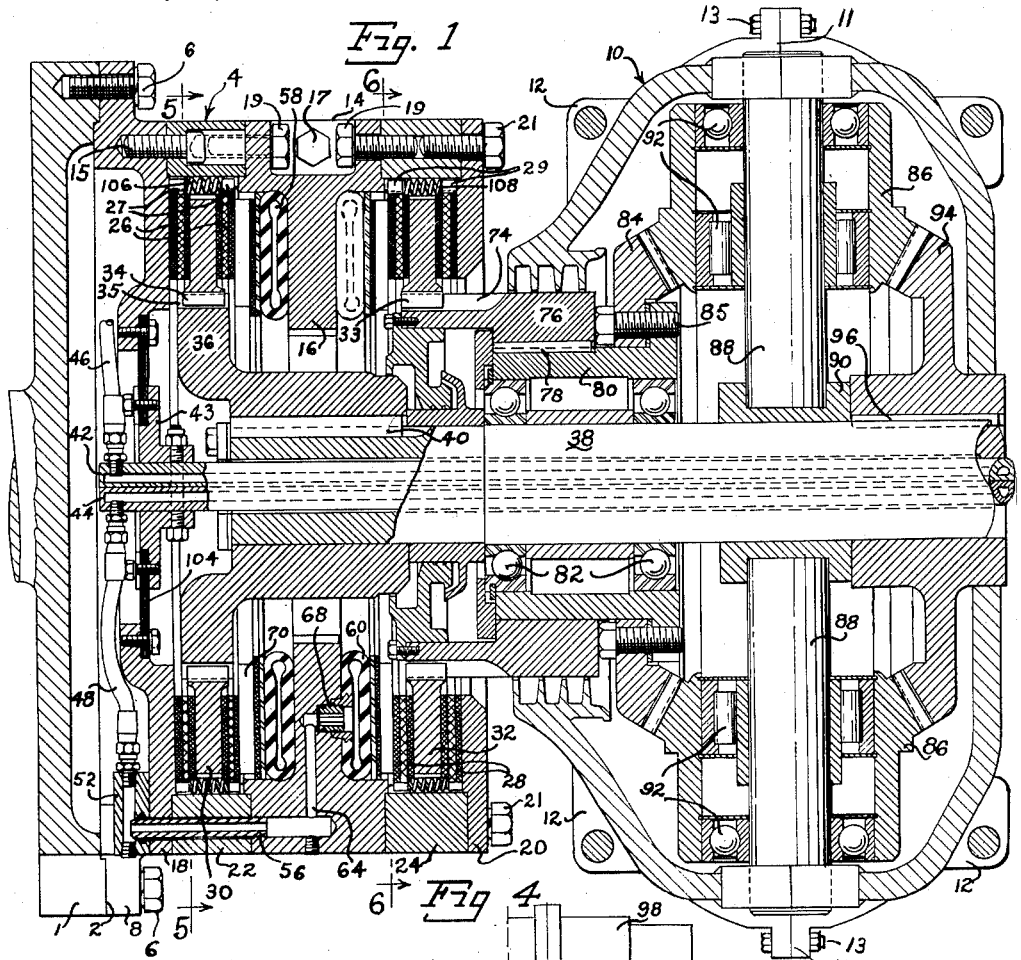
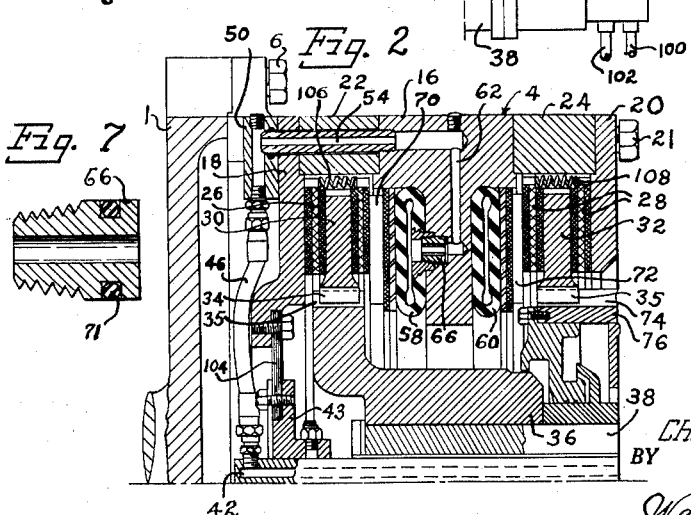
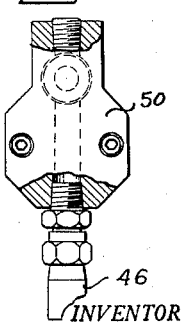
INVENTOR.
CHARLES P. WARMAN JR.
BY
Wayland D. Keith
HIS AGENT

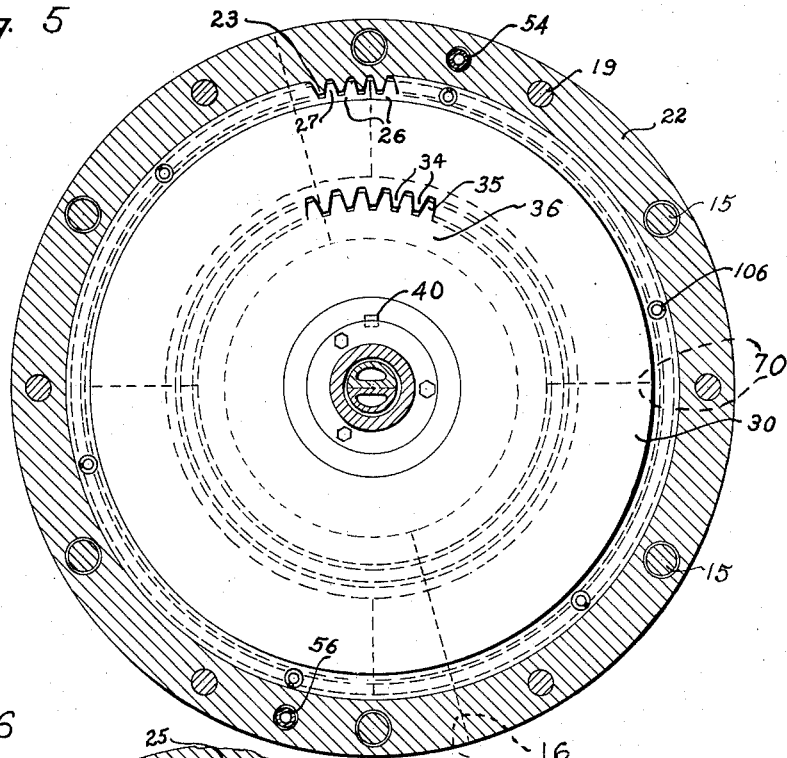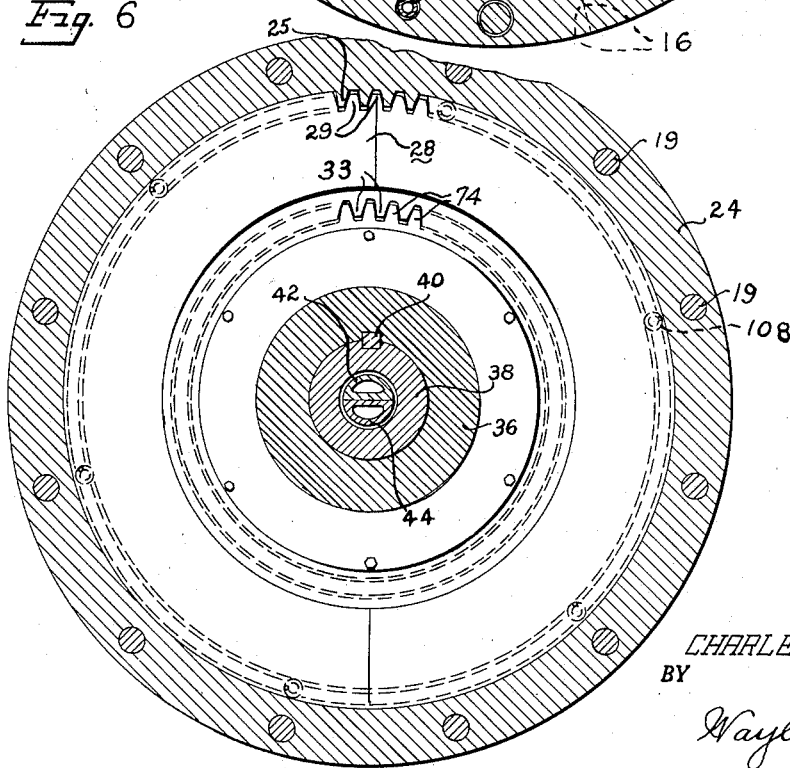

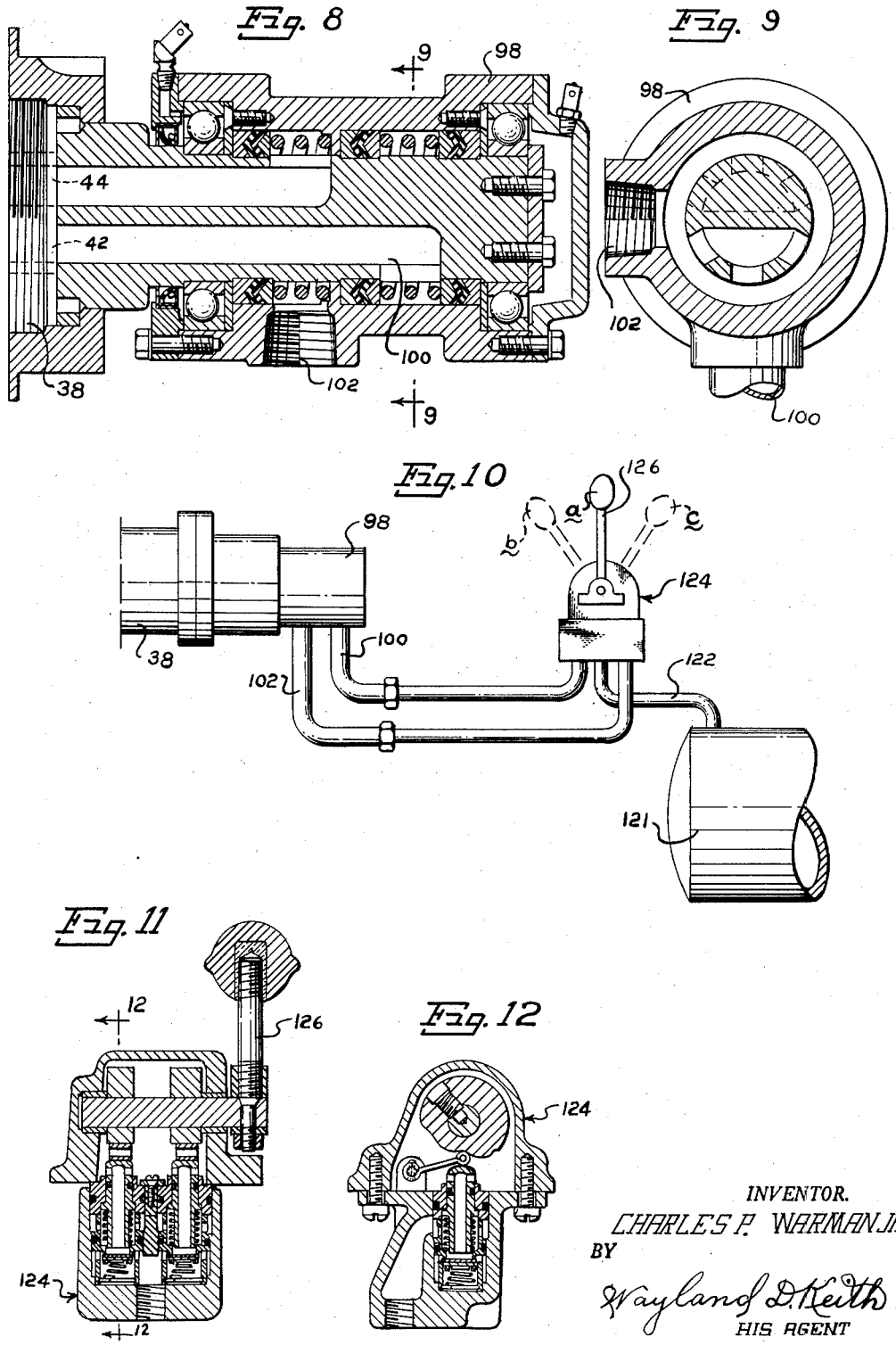

United States Patent Office 2,910,881
Patented Nov. 3, 1959

2,910,881

AXIALLY EXPANSIBLE AIR TUBE, MULTIPLE CLUTCH REVERSING UNIT

Charles P. Warman, Jr., Wichita Falls, Tex., assignor to Wichita Clutch Company, Inc., Wichita Falls, Tex., a corporation of Texas Application May 28, 1957, Serial No. 662,210

1 Claim. (Cl. 74—379)

This invention relates to improvements in clutch drive mechanisms for reversing gears, and more particularly to multi-clutch drive mechanism used for selectively reversing gears for marine applications, such as driving screw propellers and the like.

Various clutch mechanisms for reversing gears have been proposed heretofore, but these for the most part utilized mechanically actuated clutches, which presented certain limitations to the use of such mechanism.

The present clutching device enables the reversing of the clutch drive from full speed in one direction, to full speed in the opposite direction, practically instantaneously, but at the same time minimizing the shock on the driving and driven mechanism.

The present invention provides an arrangement whereby one of the multi-clutches may be selectively coupled to a single driven element in such manner that power is delivered to the driven element in either direction.

The present invention utilizes elastomer, axially expansible tubular members to cause the axial engagement of the friction clutch elements with the clutch plates, by the action of fluid pressure within the tubular elements, to cause a pressure reaction plate to move the friction elements into binding engagement with the clutch disc, so as to enable the clutch disc to be driven in the direction of rotation of the engine, however, the other of the clutch discs will be driven in the direction opposite that in which the driven plate is rotating, due to the reverse gearing arrangement, which will be more fully described hereinafter.

An object of this invention is to provide a multi-clutch coupling unit for coupling a driven element to a prime mover in such manner that the direction of the driven element may be reversed from full speed in one direction to full speed in the opposite direction by the disengagement of one clutch and the engagement of the other clutch, with a minimum of strain on the drive and driven elements.

Another object of the invention is to provide a multi-clutch coupling unit for coupling a primer mover to a driven element, which coupling unit is compact, and which is arranged to be in axial alignment with the drive shaft of the prime mover.

Still another object of the invention is to provide a clutch coupling unit having at least two fluid actuated, axially expansible, closed tubular elements which may be selectively operated from a remote station.

Yet another object of this invention is to provide a multi-clutch, multi-coupling unit which is so constructed as to allow for the removal and replacement of certain parts, normally those most subject to wear, without dismantling the major portions of the unit.

With these objects in mind, and others which will become manifest as the description proceeds, reference is to be had to the accompanying drawings in which like reference characters designate like parts in the several views thereof, in which:

Fig. 1 is a longitudinal, sectional view through a multi-clutch coupling unit, showing conventional bevel gears, and reversing gear mechanism, with parts shown in elevation and with parts broken away to show the details of construction;

Fig. 2 is a fragmentary sectional view of a portion of the multi-clutch coupling unit, showing the manner of directing fluid pressure to one of the axially expansible fluid pressure tubular elements;

Fig. 3 is a fragmentary elevational view of a fluid conduit coupling element;

Fig. 4 is a fragmentary, elevational view of a dual rotary seal for directing fluid under pressure from a stationary element to a rotating element;

Fig. 5 is a sectional view taken on the line 5—5 of Fig. 1, looking in the direction indicated by the arrows;

Fig. 6 is a view taken on the line 6—6 of Fig. 1, looking in the direction indicated by the arrows;

Fig. 7 is an enlarged, longitudinal sectional view through one of the spuds which connect to the expansible tubes, showing the O-ring sealing elements in place;

Fig. 8 is a longitudinal sectional view taken through a conventional fluid rotary seal, and showing the end thereof connected to a shaft;

Fig. 9 is a sectional view taken on the line 9—9 of Fig. 9, looking in the direction indicated by the arrows;

Fig. 10 is a diagrammatic view showing a valve means and an air supply connected to the rotary fluid seal;

Fig. 11 is a sectional view taken through a conventional air control valve; and

Fig. 12 is a sectional view taken on the line 12—12 of Fig. 11, looking in the direction indicated by the arrows, showing the operating mechanism of the valve in one position.

With more detailed reference to the drawings, the numeral 1 designates a flywheel of a prime mover, which flywheel is faced, as indicated at 2, to receive a multi-clutch coupling unit, which is designated generally by the numeral 4, thereagainst. The clutch unit 4 is bolted to the flywheel 1 by means of cap screws 6. The face plate 8 is of substantially the same diameter as the flywheel 1, and has an out-turned flange thereon to readily receive cap screws 6 through holes therein, at circumferentially spaced intervals therearound.

A reverse gear housing, designated generally at 10, is secured against rotation by a lug 12, and is in end-to-end, aligned relation with clutch unit 4.

The clutch unit 4 has a hollow housing 14, which housing is composed of a center member 16, and end members 18 and 20. Toothed rings 22 and 24 are secured between the respective end members and the center member 16. These annular, toothed rings have internal teeth therein, as indicated in Figs. 5 and 6, so that the teeth thereof will interengage the outer periphery of friction elements 26 and 28, respectively, as will best be seen in Figs. 5 and 6. It is preferable to have at least two sets of friction elements, such as indicated at 26 and 28, fitted in contact relation with the respective clutch plates 30 and 32, so the adjacent face of each friction element 26 will be in contact relation with each side of clutch plate 30, and adjacent faces of friction elements 28 will be in contact relation with the respective sides of clutch plate 32 when the clutch is engaged.

The plate 30 has teeth 34 in the inner bore thereof, which teeth complementarily engage teeth on the outer periphery of hub member 36, so that the hub 36 and plate 30 will turn in unison. The hub 36 is keyed to a shaft by means of a key 40, so as to drive the shaft in unison with the hub. The shaft 38 is preferably hollow and has air conduits 42 and 44 passing therethrough to which flexible hose units 46 and 48, respectively, are connected, which conduits direct the air outward into fittings 50 and 52, respectively. The air passes through fittings 50 and 52 into the respective conduits 54 and 56, to the respective axially expansible air tube elements 58 and 60. The conduits 54 and 56 have O-ring seals around the respective ends adjacent the fittings 50 and 52, so as to permit limited longitudinal shifting of the respective conduits, therefore close tolerances need not be maintained. The inner end of each of the conduits 54 and 56 is threaded, so as to threadably engage in a hole formed in the outer periphery of the center member 15.

The center member 16 is cross drilled, as indicated at 62 and at 64, so air may be conveyed therethrough, under pressure, inward through threaded spuds 66 and 68, respectively, into the respective axially expansible tubes 58 and 60. The spuds, as shown at 66 and 68 in Figs. 2 and 1, respectively, are shown in enlarged detail in Fig. 7, wherein an O-ring 71 is fitted within a groove formed in each of the spuds, so as to form a seal with the respective bores of the holes formed in the center member 16, through which holes the respective spuds pass.

By having these spuds connected in this manner, it is possible to readily assemble or disassemble the various parts. The center member 16 serves as a backup for axially expansible tubes 58 and 60.

On one side of each of the axially expansible tubes 58 and 60, is a ribbed, disc-like member 70 and 72, respectively. These ribbed, disc-like members are preferably made of a heat resistant material, such as reinforced asbestos or the like. The openings between the ribs form radial air passages, which permits the cooling of the clutch and clutch elements, by the air passing radially outward therethrough.

The clutch plate 32 has internal teeth, which teeth interengage with the teeth 74 on the outer periphery of a hub element 76, which hub element is keyed, by means of a key 78, to a hollow sleeve member 80, which sleeve member 80 is journaled on bearings 82, in such manner that the sleeve member 80 will rotate freely in the direction opposite to the rotation of the shaft 38. A bevel gear 84 is secured to sleeve 80 by means of bolts 85, which bevel gear 84 is enclosed within housing 10 and is in mesh with pinions 86, which pinions are mounted on a radial shaft 88 in stationary housing 10, with the housing 10 being secured to a base plate by means of bolts or the like passing through lugs 12 thereon. The housing 10 is split transversely, as indicated at 11, to permit assembly or disassembly thereof, and of the parts associated therewith. The portions of the housing 10 are held together by means of bolts 13.

A bushing 90 is provided at the inner end of shafts 88, which bushing is journaled on shaft 38. The pinions 86 have bearings 92 therein to journal the respective pinions on the respective shafts 88. A bevel gear 94 is secured to shaft 38 by means of keys 96, which bevel gear 94 is also in mesh with pinions 86, so upon rotation of bevel gear 84 in one direction, and with the housing 10 maintained against rotation, the bevel gear 94 will be driven in the direction opposite the rotation of bevel gear 84, due to the idling of bevel gear pinions 86.

A rotating coupling, as shown in Fig. 4, is provided on the outer end of shaft 38, which rotating coupling is designated by the numeral 98, which coupling has air conduit hoses 100 and 102 connected thereto, to direct air to axially expansible tubes 58 and 60, respectively. Conduits 42 and 44 pass axially through shaft 38 and are mounted on a flexible disc arrangement 104, which flexible disc arrangement permits limited endwise movement of the conduits, thereby compensating for any slight variation in the length of conduit tubes 42 and 44.

The rotary seal 98 is more particularly shown in detail in Figs. 8 and 9, however, this rotary seal is conventional, and it is to be understood that any rotary fluid seal, which is adapted to the particular application, may be used. An air supply, such as tank 121, is disclosed, which tank directs air under pressure into air supply line 122, then into a conventional air control valve 124. By manipulation of valve lever 126 from position $a$ to position $b$ or from position $a$ to position $c$, that is from neutral, as indicated at position $a$ to forward, as indicated at position $b$, or from neutral position $a$ to reverse, as indicated at position $c$, the air can be selectively directed from tank 121, through valve 124, and by manipulation of valve lever 126 the air may be directed into line 100 or 102 from zero pressure to maximum supply pressure, to cause the desired expansion of the respective elastomer tubes the desired engagement of friction elements with the respective clutch plates.

The clutch friction elements 26 and 28 are normally kept out of engagement with the respective clutch plate elements 30 and 32, by means of springs 106 and 108, which are interposed between the respective pairs of friction elements 26 and 28.

It is preferable to have the friction elements made of reinforced asbestos material, with teeth 27 and 29 on the respective outer peripheries thereof. These friction elements are preferably made segmental, as semi-annular segments, so when fitted together they form annular rings within the respective toothed rings 22 and 24. These friction elements 26 and 28 may be readily removed from the toothed rings 22 and 24, respectively, without disconnecting the shafts. This is accomplished by removing the cap screws 17 and 19, which hold the center member 16 together, which allows the center member 16 to be parted longitudinally, to enable the removal thereof laterally, and in like manner the elastomer, axially expansible tube elements 58 and 60, and the ribbed elements 70 and 72 may be removed, as are the friction elements 26 and 28, and these parts may likewise be reinserted.

The elastomer, axially expansible elements 58 and 60 are substantially annular in form, except that each tube is formed in curvilinear shape, but the ends thereof are not joined, and which ends are closed to retain air within the tube. The elastomer material from which the tubes 58 and 60 are made allows sufficient yieldability thereof to enable the unjoined ends to be spread apart, so these tubes may be passed laterally outward over the hub member 36. The ribbed members 70 and 72 are also made up of semi-annular segments to form annular members, and these may be removed laterally from the housing 15 in a manner similar to the removal of the friction elements 26 and 28.

It is to be pointed out that the present arrangement means a great saving of time, in disassembly and reassembly of the device, as a minimum amount of machinery need be dismantled for the repair and/or replacement of internal clutch parts.

Cap screws 15 pass through circumferentially spaced holes in toothed ring 22 to securely hold the ring 22 to end member 18. Cap screws 21 are provided at the opposite end of housing 14 to bolt the end member 20 to annular toothed ring 24. The bolts 19, when removed from threaded engagement with toothed rings 22 and 24, permit the longitudinal shifting of center member 16 sufficiently to disengage the pilot shoulders, whereupon, cap screws 17 may be removed so as to enable the center member 16 to be parted longitudinally and removed laterally to enable the removal of the various clutch tubes and friction elements.

The toothed hub 36 is rigidly keyed to shaft 38 by means of a key 40 and is always coaxial therewith. The toothed hub 76 is rigidly keyed to sleeve 80, which sleeve 80 is mounted on bearings 82, which bearings maintain the toothed hub 76 in coaxial relation with shaft 38, with the respective teeth 34—35 between hub 36 and floating clutch plate 30 and teeth 33—74 between hub 76 and clutch plate 32, a limited flexible alignment is provided between the clutch unit 4 and the reverse gearing mechanism 10, as the flexible disc arrangement 104 will permit a limited angular divergence between the axis of the clutch unit 4 and the axis of the reverse gear mechanism, with the teeth 34—35 and 33—74 being sufficiently loose to permit angular shifting, to permit limited aligning.

*Operation*

The present device is utilized for the sudden reversing of driven elements, and more particularly for reversing machinery such as boat propellers, shafts, and the like, whereby a shaft may be reversed from full speed in one direction, to full speed in the reverse direction, with a minimum of shock, and in the shortest possible time, with the flywheel 1 turning in the usual direction and with clutch unit 4 bolted to and rotating therewith, and with the axially expansible air tubes 58 and 60 deflated, the housing 14 will rotate, however, clutch plates 30 and 32 will remain in non-rotatable position. Upon directing air from a remote control station (not shown) into a conduit 100 connected to a rotary air seal 98, the air will be directed through conduit 42 into hose 46, thence through a fitting 50 through conduit 54, passage 62, and spud 66 into axially expansible tube 58, whereupon the tube, as shown in Figs. 1 and 7, will move ribbed element 70 into binding engagement with friction element 26 to compress springs 106, whereupon, the faces of the friction elements 26 adjacent clutch plate 30 will bindingly engage the clutch plate, as center member 16 prevents inward movement of axially expansible tube 58, and end member 18 prevents outward movement of the outermost friction element 26.

With the clutch plate 30 secured in frictional engagement between friction elements 26, upon rotation of housing 14, the clutch plate 30 will rotate therewith, and with the teeth 34 of the clutch plate interengaged with the teeth on the outer periphery of hub 36, the hub 36 will turn in unison with the clutch plate and will drive the shaft 38 through the key 40, as the key 40 interlocks the hub 36 with the shaft 38. This will give a direct drive to the driven element connected to shaft 38.

A bevel gear 94 is also secured to the shaft 38 by means of a key 96, which will cause the bevel gear 94 to rotate in the same direction as shaft 38. The bevel gear 94 is rotatably mounted within stationary housing 10, which stationary housing 10 has one or more shafts 88 positioned therein, which shafts are at right angles to the shaft 38. Bevel gear pinions 86 are mounted on the respective shafts 88, so that the bevel gear pinions will turn about the respective axes thereof, which bevel gear pinions 86 are in meshed engagement with a bevel gear 84, which is similar to bevel gear 94. The bevel gear 84 is secured to a sleeve member 80, by means of cap screws or the like, which sleeve member 80 is journaled on bearings 82 so that bevel gear 84 and sleeve 80 may rotate in the opposite direction to the rotation of the shaft 38. A toothed hub 76 is keyed to sleeve member 80 with the teeth 74 interengaging with the teeth on the inner bore of clutch plate 32, which clutch plate 32 is similar in construction and in operation to the clutch plate 30. The clutch plate 32 has friction elements 28 positioned on each side thereof, which friction elements are normally held apart by springs 108.

An axially expansible, elastomer tube 60 is positioned within hollow housing 14, with one side of the tube member being in abutting relation with center member 16 and with the opposite side of the tube member 60 being in contact relation with a ribbed spacer element 72, which spacer element is interposed between the tube 60 and the innermost friction element 28.

With the shaft 38 being driven in one direction by clutch plate 30 being engaged with friction elements 26, the reversing of the shaft 38 may be accomplished by suddenly releasing air pressure from conduit 100, so as to deflate axially expansible tube 58, which will permit springs 106 to move friction elements 26 out of engagement with clutch plate 30, then air pressure is directed from a remote control station into conduit 102, through rotary air seal 98 into conduit 44, hose 48, fitting 52, thence through conduit 58 and passage 64 into spud 68, which is connected with axially expansible, elastomer air tube 60, whereupon the pressure will cause tube 60 to move ribbed elements 72 against the innermost friction element 28, which will cause the friction element to move against clutch plate 32 to compress springs 108, which movement will cause frictional engagement of friction elements 28 with clutch plate 32, which clutch plate 32 is rotating in the opposite direction from clutch plate 30, if the driven element is being reversed, and as the engagement pressure on friction elements 28 increases on plate 32, a braking action is accorded between the clutch plate 32 and the friction elements 28 until the rotating motion of clutch plate 32 is arrested. Since the friction elements 28 are in positive, toothed engagement with ring 24, by the interengagement of the teeth thereof, the clutch plate 32 will be driven in the opposite direction, which plate 32 is connected through teeth 74, toothed hub 76 by a key 78 to sleeve 80, to cause the rotation of bevel gear 84 in the same direction as the rotation of the housing 14, whereupon, the bevel gear pinions 86 are rotated to drive bevel gear 94 in the opposite direction, and since bevel gear 94 is keyed to shaft 38 by a key 96, the driven element will be driven in the opposite direction. This causes the shaft 38 to rotate within bearings 82 to drive clutch plate 30 in the direction opposite to the rotation of the clutch plate 32.

The rings 22 and 24 have internal teeth 23 and 25, respectively, therein, to engage in complementary, telescoping relation with teeth 27 and 29 of the respective friction elements 26 and 28, therefore, the friction elements 26 and 28 rotate with the rotation of the housing 14. The clutch plate 30 rotates in the same direction as the rotation of the shaft 38, and the clutch plate 32 will always rotate in the direction opposite to the rotation of the shaft 38 when the shaft 38 is rotating.

Having thus described the invention, what is claimed is:

In a multi-clutch unit, a housing, which housing has two series of internally formed teeth therein, a pair of axially expansible, elastomer tube elements positioned in said housing and being spaced apart in co-axial relation, a member forming an abutment adjacent a side of each of said axially expansible, elastomer tube elements, an axially movable element mounted adjacent the side of each elastomer tube element opposite said member forming an abutment, a pair of inner friction elements having peripheral teeth formed thereon, a pair of outer friction elements having peripheral teeth formed thereon, said teeth of said pairs of friction elements being in interengaged, sliding relation with the respective series of internally formed teeth in said housing, said axially movable elements having the side opposite said elastomer tube elements in contact relation with a side of said respective friction elements, a shaft, which shaft is co-axial with said housing, said shaft being mounted in said housing for selective, relative rotation with respect thereto, a peripherally toothed hub, which toothed hub is co-axial with said shaft and fixedly secured thereto near an end thereof, a first clutch plate, a second clutch plate, each of said clutch plates having teeth formed internally thereof, said first clutch plate having the teeth thereof in interengaged, sliding, driving relation with the teeth of said toothed hub, a toothed sleeve, which sleeve is co-axial with said shaft and is journaled for selective, relative rotation thereon, said second clutch plate having the teeth thereof in interengaged, sliding, driving relation with the teeth of said toothed sleeve, the adjacent inner and outer friction elements being co-axial with said shaft and having adjacent sides fitted for contact relations with the sides of the respective plate, and means connecting said toothed sleeve to said shaft in reverse geared relation so as to rotate in an opposite direction from said shaft, said respective elastomer tube elements having conduits leading thereto to enable fluid pressure to be selectively directed to said respective elastomer tube elements to enable the selective gripping of one of said clutch plates between a pair of said friction elements.

References Cited in the file of this patent
UNITED STATES PATENTS

| | | |
|---|---|---|
| 1,577,004 | Turney | Mar. 16, 1926 |
| 2,271,036 | Schmitter et al. | Jan. 27, 1942 |
| 2,747,711 | Schmitter et al. | May 29, 1956 |